(12) United States Patent
Lefurgy et al.

(10) Patent No.: US 8,015,566 B2
(45) Date of Patent: Sep. 6, 2011

(54) ATTRIBUTING ENERGY CONSUMPTION TO INDIVIDUAL CODE THREADS IN A DATA PROCESSING SYSTEM

(75) Inventors: Charles R. Lefurgy, Round Rock, TX (US); Malcolm Scott Ware, Austin, TX (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 2003 days.

(21) Appl. No.: 11/034,558

(22) Filed: Jan. 13, 2005

(65) Prior Publication Data
US 2006/0155415 A1    Jul. 13, 2006

(51) Int. Cl.
*G06F 9/46*    (2006.01)
(52) U.S. Cl. ........................................................ 718/104
(58) Field of Classification Search .................. 718/104, 718/106; 713/300, 320, 340
See application file for complete search history.

(56) References Cited

U.S. PATENT DOCUMENTS

| | | | | |
|---|---|---|---|---|
| 6,609,208 | B1 * | 8/2003 | Farkas et al. | 713/320 |
| 6,658,654 | B1 * | 12/2003 | Berry et al. | 717/131 |
| 6,687,558 | B2 * | 2/2004 | Tuszynski | 700/97 |
| 7,197,652 | B2 * | 3/2007 | Keller et al. | 713/320 |
| 7,426,731 | B2 * | 9/2008 | Findeisen | 718/104 |
| 2006/0107262 | A1 * | 5/2006 | Bodas et al. | 718/100 |

OTHER PUBLICATIONS

Chen, Rita Yu, "An Architectural Level Power Estimator", ISCA 98, Jun. 1998, pp. 1-5.*
Flinn, Jason, and Satyanarayanan, PowerScope: A Tool for Profiling the Energy Usage of Mobile Applications; Proceedings of the Second IEEE Workshop on Mobile Computer Systems and Applications, IEEE Computer Society, 1999, Washington, DC.

* cited by examiner

*Primary Examiner* — Emerson Puente
*Assistant Examiner* — Gregory Kessler
(74) *Attorney, Agent, or Firm* — Lieberman & Brandsdorfer, LLC

(57) ABSTRACT

A data processing system attributes energy consumption to individual program segments or threads includes a processor that executes a first thread during a first portion of a measurement interval and a second thread during a second portion of the interval. An energy monitor measures the total energy during the interval. Energy attribution code attributes a first amount of the total energy to the first thread and a second amount to the second thread based in part on the execution times of the threads. The code may define a range of possible energy values by determining maximum and minimum energy constraints for the threads. The invention may also be extended to a multiprocessor environment and to a simultaneous multithreading (SMT) processor. In addition, the process may be expanded to determine energy consumed by various peripheral units such as hard disk controllers and the like.

16 Claims, 7 Drawing Sheets

ATTRIBUTING ENERGY CONSUMPTION TO INDIVIDUAL CODE THREADS IN A DATA PROCESSING SYSTEM

BACKGROUND

1. Field of the Present Invention

The present invention is in the field of data processing systems and, more particularly, in the field of power consumption in a data processing system.

2. History of Related Art

Power consumption is an increasingly important concern for manufacturers and users of data processing systems. Efforts to reduce power consumption have traditionally emphasized hardware design. One may reasonably assume, however, that the manner in which the system executes software has some effect on power consumption. For example, in a multitasking environment where multiple software threads are executing concurrently, it likely that the energy consumption attributable to the execution of any individual thread is a function of the code contained in the thread. In other words, the energy consumption attributable to one thread is most likely different than the energy consumption attributable to another thread.

Under the hypothesis that energy consumption is thread-dependent, it would be desirable to have accurate information indicating the amount of energy attributable to each thread. With this information, one could then focus software-based energy conservation efforts on the worst-case threads. Unfortunately, accurate information regarding the amount of energy attributable to software threads is not generally available. It would be desirable, therefore, to implement a system and method for measuring the amount of energy attributable to each thread executing in a multitasking environment.

SUMMARY OF THE INVENTION

The identified objective is achieved with a data processing system capable of attributing energy consumption to individual program segments or threads. The system includes a processor that executes a first thread during a first portion of a measurement interval and a second thread during a second portion of the interval. An energy monitor measures the total energy consumed by the processor during the measurement interval. Energy attribution code attributes a first amount of the total energy consumed by the processor to the first thread and a second amount of the total energy consumed by the processor to the second thread. The code determines the execution time of the first and second threads and uses the execution times to estimate the amount of the total energy attributable to the first and second threads. The code may determine maximum and minimum energy constraints for the first and second threads. The code may then use the constraints and the total energy to determine a second set of maximum and minimum energy constraints. A range of possible energy values is then determined and the mid point of the range is used as the estimate. The invention may be applied at an operating system level to attribute energy consumption to individual processes or threads or at a hypervisor level to attribute energy to individual operating systems. The invention may also be extended to a multiprocessor environment and to a simultaneous multithreaded (SMT) processor. In addition, the process may be expanded to determine energy consumed by various peripheral units such as hard disk controllers and the like.

BRIEF DESCRIPTION OF THE DRAWINGS

Other objects and advantages of the invention will become apparent upon reading the following detailed description and upon reference to the accompanying drawings in which.

Figure 1:
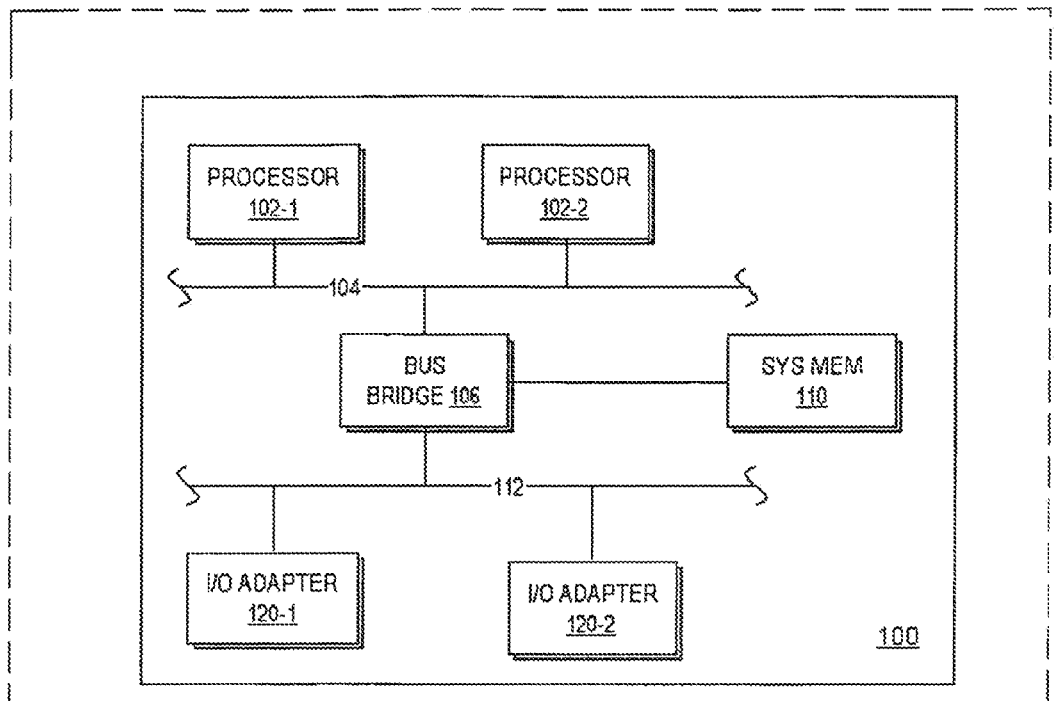
FIG. 1 is a block diagram of selected elements of a data processing system according to an embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking the present invention is concerned with determining the components of energy consumption in a data processing system. One aspect of the invention includes allocating microprocessor energy consumption among individual software applications and, more specifically, software threads being executed by a microprocessor. The data processing system includes a hardware-based mechanism for determining the energy consumed during a specified interval referred to herein as the measurement interval. In conjunction with operating system code that conveys information about the time during which threads are actively executing, the data processing system estimates the energy consumed by each thread that executed during a particular measurement interval. This concept may be expanded to encompass, for example, a hypervisor level attribution of energy consumption among multiple executing operating systems and attribution of peripheral component energy consumption. The invention extends to multiprocessor implementations and may even be extended to encompass simultaneous multi-threaded (SMT) processors.

Referring now to FIG. 1, selected elements of a data processing system 100 suitable for implementing the present invention are depicted. In the depicted embodiment, system 100 includes one or more processors 102-1 and 102-2 (generically or collectively referred to herein as processor(s) 102). Processors 102-1 and 102-2 may be implemented as distinct devices in separate packages or modules. In other implementations, processors 102 may be contained within a single package (e.g., a multi chip module or MCM). Processors 102 may be implemented with a RISC (reduced instruction set computer) chip such a PowerPC® family processor from IBM Corporation or with an x86-type processor such as a Pentium® family processor from Intel.

In the depicted embodiment, processors 102 of system 100 are connected to a shared host bus 104. The depicted embodiment of host bridge 106 includes an integrated memory controller that provides an interface between shared system memory 110 and processors 102. System memory 110 is preferably a large array of volatile, dynamic memory (DRAM) modules.

Host bridge 106 also provides an interface between host bus 104 and a shared peripheral bus 112. The shared peripheral bus 112 is preferably compliant with an industry standard peripheral bus protocol such as PCI or PCI-X. Although bus bridge 106 is depicted as a distinct element, portions of bus bridge and memory controller 106 may be integrated into the processors 102. Conversely, bridge 106 may also be implemented as a multiple-chip chip set.

The depicted embodiment of system 100 includes multiple I/O adapters 120-1 and 120-2 (generically or collectively referred to herein as I/O adapter(s) 120) connected to shared peripheral bus 112. I/O adapters 120 may represent any of a variety of well-known peripheral devices. Such adapters might include, as examples, hard disk controller adapters, graphics adapters, audio adapters, and so forth.

Portions of the present invention and data processing system 100 may be implemented as software code (i.e., a sequence or set or computer executable instructions) that attributes energy consumed by a microprocessor to individual components within the data processing system. This software code is stored on a computer readable medium such as a magnetic hard disk, an optical disk (CD or DVD), a flash memory device or other form of EEPROM, a magnetic tape, and the like. During times when portions of the computer software code are being executed, portions of the code may reside in a volatile storage medium such as system memory 110 or an internal or external cache memory (not depicted) of processors 102.

Figure 2:
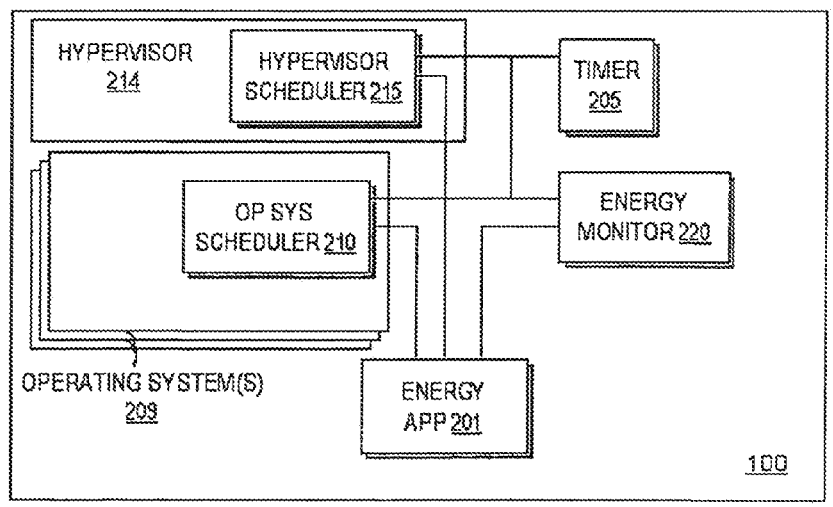
FIG. 2 is a block diagram of selected elements of the system of FIG. 1 emphasizing facilities to measure the energy consumption and allocate the energy consumption to component elements of the system according to one embodiment of the invention.

Referring to FIG. 2, selected components of data processing system 100 are depicted to emphasize the ability of data processing system 100 to estimate energy consumed by various threads or processes executing on the system. The depicted embodiment of system 100 includes an energy monitor 220 enabled to communicate with a hypervisor scheduler 215, an operating system scheduler 210, and an energy attribution application 201.

A common, free-running timer 205 is preferably available to energy monitor 220 and the OS and hypervisor schedulers 210 and 215. Timer 205 allows for a common determination of time by two resources that are otherwise independent. Such precision is desirable so that the resources can communicate with one another about how events (energy measurements and context switches) have been timed. In an alternative embodiment (not depicted), energy monitor 220 and schedulers 210 and 215 maintain their own internal timers that have been synchronized by another means.

One embodiment of the invention operates within the context of a single operating system 209 to estimate energy consumption attributable to the multiple threads executing under the operating system. In another embodiment, however, this paradigm is expanded to the hypervisor level. For purposes of this disclosure, a hypervisor 214 is a layer of software that provides hardware management capabilities and isolation to multiple virtual machines or partitions running on a single physical system. Each partition has its own instance of an operating system environment such that two or more distinct operating systems may be executing concurrently on a single physical system. As an example, a logically partitioned implementation of data processing system 100 may, in theory, include a one or more instances of an Unix-derivative operating system such as the AIX® operating system from IBM, one or more instance of a Linux-type operating system, and one or more instances of a Windows® family operating system from Microsoft.

For purposes of the present invention, the relevant portion of hypervisor 214 is the hypervisor scheduler 215 shown in FIG. 2. Hypervisor scheduler 215 conveys information regarding the time of hypervisor-level context switches that occur. In a logically partitioned system, a first one of the operating systems 209 may execute or otherwise exercise control over the system during a first interval while a second operating system executes during a second interval. Hypervisor scheduler 215 embodies code that controls and monitors the transitions among the active operating systems. Hypervisor scheduler 215 is enabled to provide the energy attribution application 201 with information regarding the precise time of hypervisor level context switches (i.e., switches between a first operating system and a second operating system).

Although the one embodiment of the present invention encompasses hypervisor level context switches, a potentially more pervasive application of the invention is implemented at the operating system level. In this implementation, an operating system scheduler 210 communicates operating system-level context switches to energy attribution application 201. The concept of an operating system scheduler 210 is well known.

Operating systems are responsible, among other things, for scheduling the execution of multiple, concurrent threads. A thread represents the smallest granule of a computer program or application. A single application may spawn multiple execution threads. If, however, one is able to attribute energy consumption at a thread level, energy consumption may be attributed at the program or application level by trivially summing all of the threads corresponding to a particular program.

For the sake of clarity, this disclosure refers to the execution of individual threads and does not explicitly refer to programs or applications. It will be appreciated, however, that a program or application, for energy consumption purposes, is equal to the sum of its threads and that the described implementation encompasses the attribution of energy consumption at an application or program level. Moreover, because the operating system level application is potentially more applicable than the hypervisor level application, the bulk of this disclosure emphasizes the former.

Thus, as depicted in FIG. 2, data processing system 100 includes an operating system scheduler 210 in communication with energy attribution application 201. Operating system scheduler 210 communicates timestamp information to energy attribution application 201. The timestamp information conveyed by operating system scheduler 210 indicates the time of and threads involved in a context switch. A context switch represents a transition from a first state in which the processor is executing instructions from a first thread to a second state in which the processor is executing instructions from a second thread.

When data processing system 100 experiences a context switch, operating system scheduler 210 is configured to convey the context switch information to energy application 201. Energy application 201 also receives energy consumption data from an energy monitor 220. Energy monitor 220 is preferably implemented in hardware and firmware and is connected to the system board (the printed circuit board or planar to which processor(s) 102 are connected.

Figure 10:
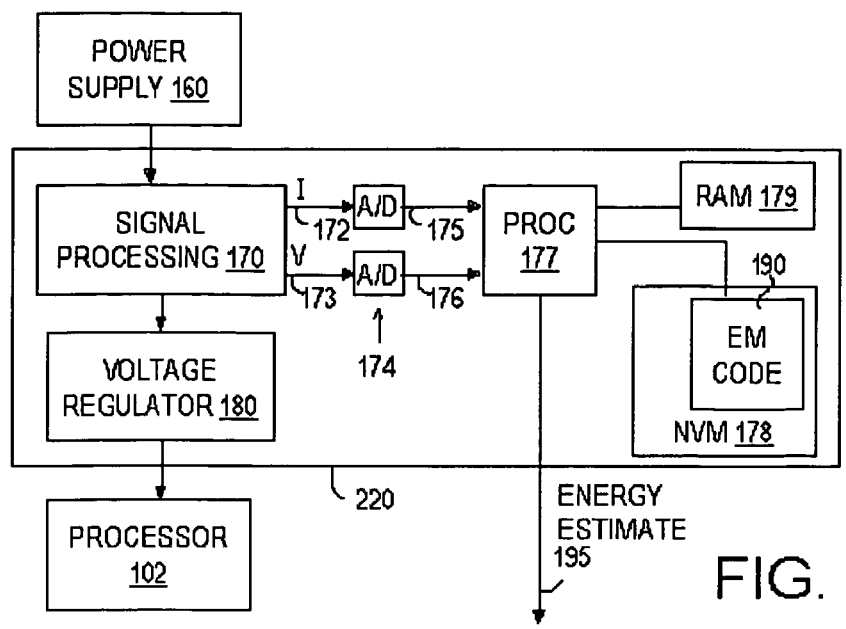
FIG. 10 is a block diagram of selected elements of an energy monitoring device according to an embodiment of the present invention.

Referring to FIG. 10, a block diagram showing selected elements of an exemplary implementation of energy monitor 220 is presented. In the depicted embodiment, energy monitor 220 is connected to a power supply 160 that provides power to a processor 102. Energy monitor 220 includes signal processing logic 170 that generate a current signal 172 and a voltage signal 173. Current signal 172 indicates the current being drawn from power supply 160 while the voltage value 174 indicates voltage output of power supply 160. In one embodiment, the current signal 172 and voltage signal 173 are continuous analog signals.

Energy monitor 220 includes analog to digital converters 174 that convert current signal 172 and voltage signal 173 to digital values 175 and 176 respectively. A processor or controller 177 receives the digital signals 173 and 175 and executes energy monitoring code 190, which is preferably stored in a flash memory or other nonvolatile memory (NVM) device 178, to determine an estimate 195 of the energy consumed. More specifically, energy monitoring code 190 determines the product of current signal 173 and voltage signal 175. The product of a current value and a voltage value yields an instantaneous power value, which has the units of energy/time. To derive an energy estimate, monitoring code 190 integrates the instantaneous power values over a particular interval to produce an estimate 195 of the energy consumed by processor 102 during the sampled interval.

In one embodiment, energy monitor unit 220 produces energy estimate values 195 for intervals that are approximately 1 ms in duration. These 1 ms intervals are referred to as measurement intervals. Internally, energy monitor unit 220 may produces 10 to 20 intermediate values during the 1 ms measurement interval. One implementation of energy monitor 220 stores these intermediate values. In this case, one or two of the intermediate energy estimate values may be retrieved when it is advantageous to use an energy estimate for a different measurement interval. One embodiment of the invention, discussed below with respect to FIG. 5, makes use of this feature of energy monitor 220 to produce energy estimates for measurement intervals that closely match the context switches of processor 102. Aligning the energy estimate measurement interval to a particular context switch interval (the interval during which a particular thread is executing) produces highly accurate estimates of the amount of energy consumption attributable to the thread.

Figure 3:
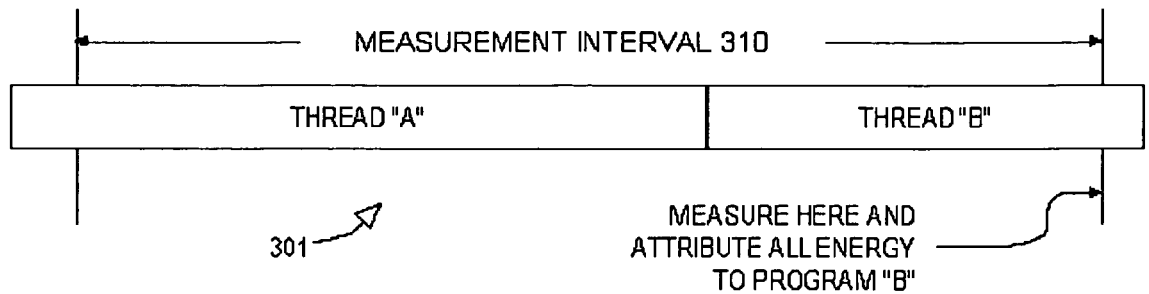
FIG. 3 is a conceptual representation of a first technique for allocating energy consumption to individual threads.
Figure 4:
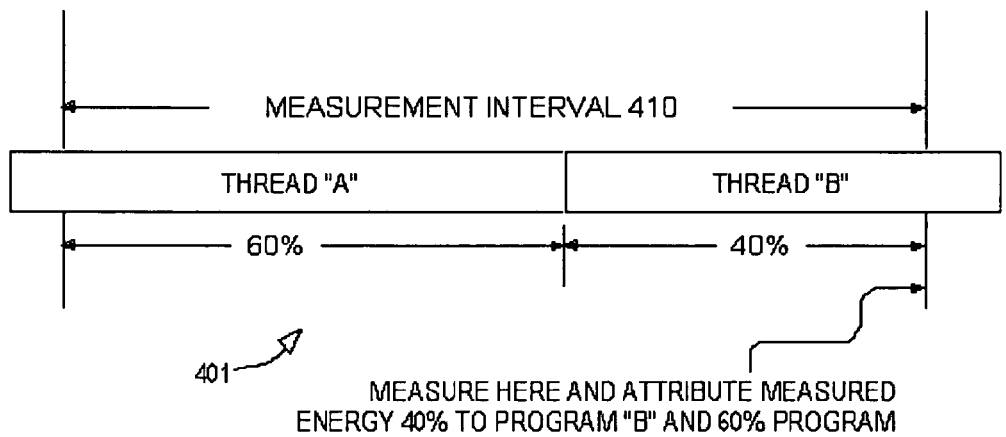
FIG. 4 is a second conceptual representation of a second technique for allocating energy consumption to individual threads.
Figure 5:
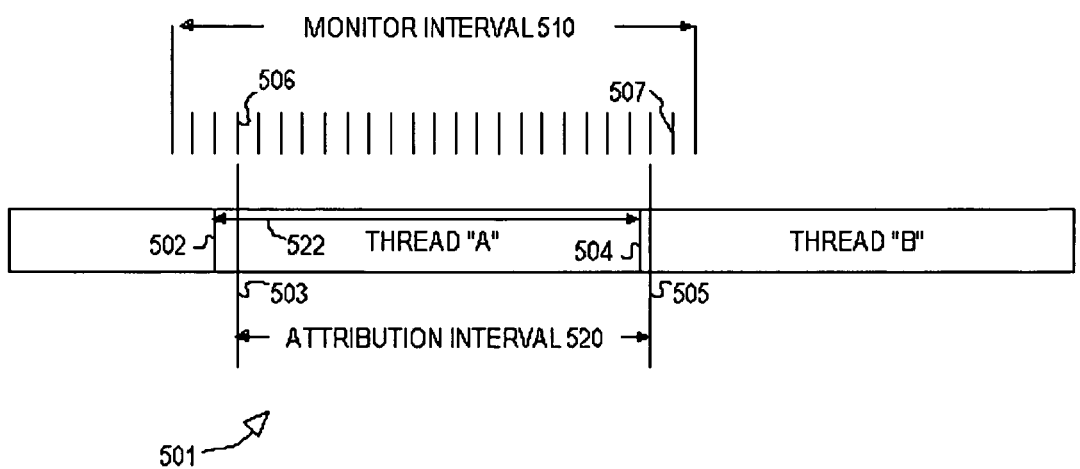
FIG. 5 is a third conceptual representation of a third technique for allocating energy consumption to individual threads.

Referring now to FIG. 3, FIG. 4 and FIG. 5, conceptual depictions of three alternative embodiments of techniques for attributing energy consumption to individual threads executing on processor 102 are depicted. In each of these embodiments, it is assumed that there are two active threads, namely, a first thread denoted as thread "A" and a second thread denoted as thread "B." It is also assumed that processor 102 is executing only one of threads at any instance in time (i.e., processor 102 does not have simultaneous multithreading (SMT) capability).

In cases where three or more threads are executing, the problem of attributing power consumption among the threads resolved by an iterative process in the power attributable to a selected thread is determined by lumping all other threads together. For a case in which, for example, three threads (A, B, and C) are executing, one may determine power attributable to thread A by lumping threads B and C together (i.e., A vs. all other threads). Power attributable to thread B is then determined by lumping threads A and C together and so forth. In this manner, the problem of three or more threads is reduced to a plurality of problems involving two threads and each of these two-thread cases may be treated as described below. With respect to the assumption of a non-SMT processor, the SMT case will be discussed in regards to FIG. 11.

Referring to FIG. 3, a first technique 301 for attributing a processor's energy consumption to the active threads executing on the processor is depicted. In FIG. 3, thread A executes for a first portion of a measurement interval 310 while thread B executes for a second portion of measurement interval 310. At the end of the measurement interval, the energy monitor 220 reports the energy consumed by the processor. Because thread B is the currently active thread at the measurement point (i.e., the end of the measurement interval) the first method 301 attributes all of the consumed energy to thread B. While this technique is relatively simple to implement, it is not an accurate method of attributing energy because it fully discounts energy attributable to all threads except the thread that is active at the end of the measurement interval. Assuming the thread that happens to be active at the end of any particular measurement interval reflects the percentage of time that the thread is active and further assuming that threads consume energy at roughly the same rate per time, method 301 of attributing energy may ultimately produce fairly accurate results if enough samples are taken, but these assumptions are often not valid and improved results can be achieved.

Referring now to FIG. 4, a second method 401 of attributing processor energy to the individual threads is shown. Second method 401 attributes energy among various threads by using the energy consumption information provided by energy monitor 220 in conjunction with context switch information provided by an OS scheduler (or hypervisor scheduler). Like FIG. 3 depicting the first energy attribution method 301, second attribution method 401 illustrates an example in which a first thread (thread "A") is active during a first portion of the measurement interval 410 and a second thread (thread "B") is active during a second portion of the interval. In the depicted illustration, the OS scheduler provides time stamp information indicating the time at which the context switch 412 (the time when thread B became the active thread) occurs. The energy monitor unit 220 provides time stamp information from which the time of the beginning and ending of measurement interval 410 is known. Using this time stamp information, the energy monitoring application can determine that thread A was active for 60% of the measurement interval while thread "B" was active for 40% of the measurement interval. From this information, a more accurate attribution of energy among the active threads is possible. Instead of attributing all of the energy to thread B, method 401 recognizes that multiple threads may have been active during a particular measurement interval. A simple, pro rata attribution of energy between threads A and B, while yielding better energy attribution results than method 301, still contains an assumption that the threads expend energy at approximately the same rate. Errors introduced by this assumption will be reduced as described below with respect to FIG. 6 and FIG. 7.

Turning now to FIG. 5, a third method 501 for attributing energy among active threads is shown. Method 501 produces more accurate assessments of individual thread energy consumption by aligning the energy monitor measurement interval to the context switches of the processor. Although perfect alignment between context switches and energy monitor measurement intervals is not feasible, adequate alignment is obtainable. In the technique depicted in FIG. 5, an interval 520 (referred to as the attribution interval) over which energy consumption is measured and attributed is aligned, as closely as possible, to an interval during which the thread of interest is active. In FIG. 5, the interval 522 during which thread A is active is defined by a first context switch 502 (when thread A becomes active) and a second context switch 504 (when a different thread becomes active). In this manner, thread A is active for a significant majority of measurement interval 520 and the energy attribution techniques described herein have less error margin.

In one embodiment, method 501 includes retrieving historical, intermediate energy measurement values generated by energy monitor 220 during a particular measurement interval. In this embodiment, there may be a distinction between the attribution measurement interval 520 used to attribute energy to executing threads and the monitor measurement interval 510, which is analogous to the measurement intervals 410 and 310 of FIG. 4 and FIG. 3 respectively. As described above, energy monitor 220 may have a fixed measurement interval 520 (e.g., 1 ms) and it may generate and store a number of intermediate measurements during the measurement interval.

In method 501, the energy attribution technique may retrieve one or two intermediate values (506 and 507) to determine the energy estimate for the attribution measurement interval 520. Whereas monitor measurement interval 510 represents a hardware/firmware characteristic or constraint of energy monitor 220, attribution measurement interval 520 is a derived interval for purposes of matching context switches to measurement intervals. The beginning of attribution measurement interval 520 is determined by using the intermediate measurement (506) closest in time to the beginning of the thread A execution interval (i.e., the context switch 502). Similarly, the end of attribution measurement interval 520 is determined by using the intermediate measurement (507) closest in time to the end of the thread A execution interval (context switch 504).

Figure 6:
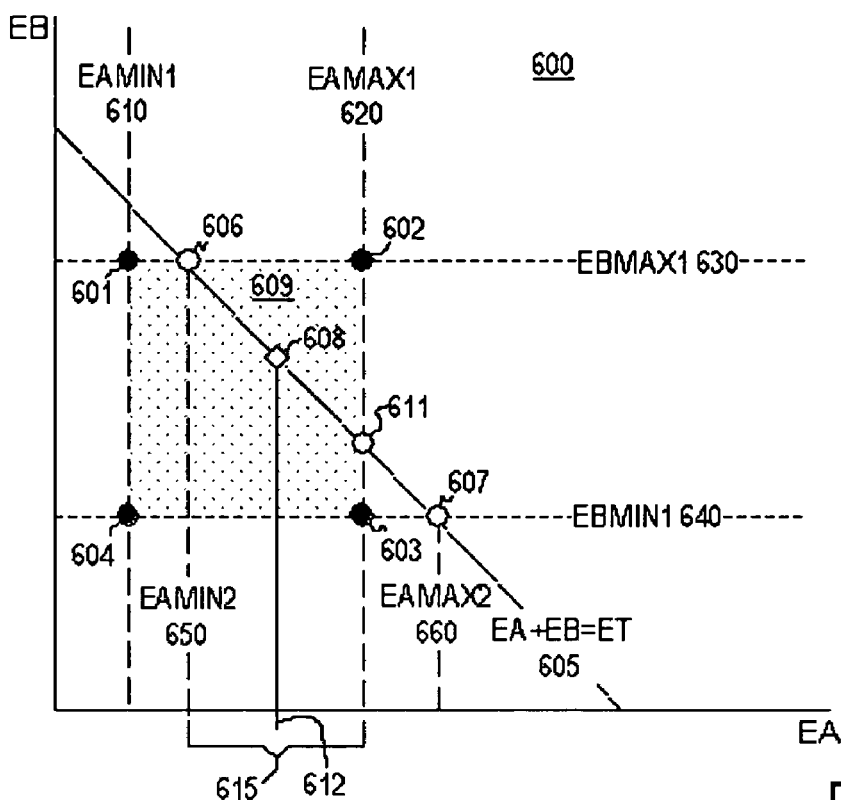
FIG. 6 is a graphical representation of a second technique for allocating energy consumption to individual threads.
Figure 7:
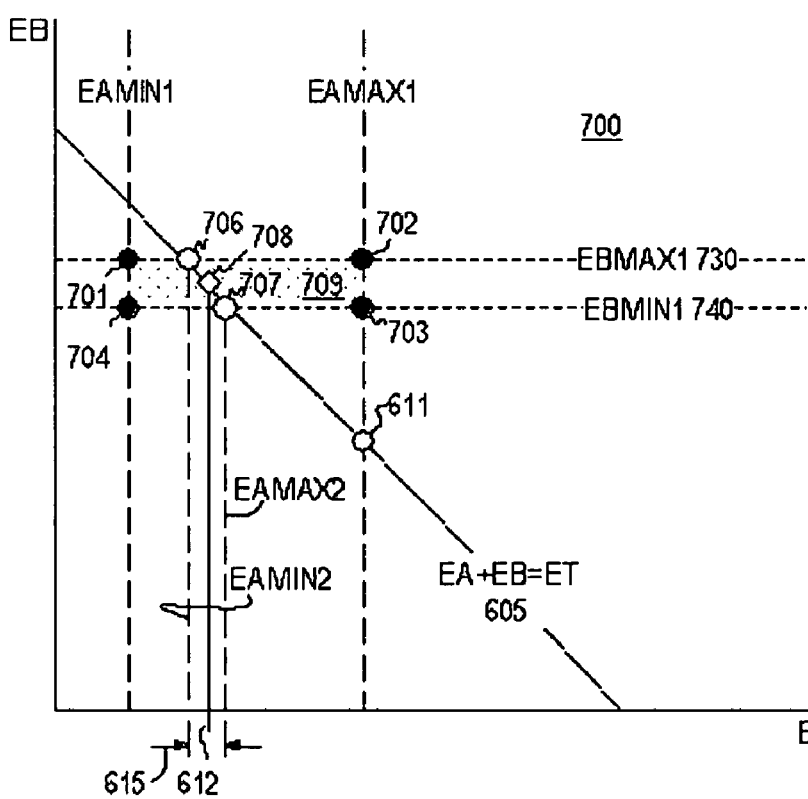
FIG. 7 is a graphical representation of a third technique for allocating energy consumption.

While FIG. 4 and FIG. 5 depict the attribution methods 401 and 501 broadly and conceptually, further refinements of both techniques are illustrated graphically in FIG. 6 and FIG. 7. The graphical representation of FIG. 6 corresponds to method 401 in which the monitor measurement interval and the attribution measurement interval are the same. In this technique, a thread may be active for substantially any portion of the measurement interval. The graphical representation of FIG. 7 corresponds to the method 501 of FIG. 5 in which context switching and measurement intervals are more closely aligned. In this embodiment, the measurement interval is largely dominated by a single thread so that, for example, a dominant thread is active in excess of approximately 90% of the interval and one or more secondary threads are active for less than approximately 10% of the interval. The 90/10 figures are implementation specific, but convey the concept that it is desirable to match measurement intervals and context switches closely.

FIG. 6 and FIG. 7 also introduce the concept of a maximum and minimum energy attributable to each active thread. Processor 102 has physical and implementation constraints on the amount of energy its consumes during a specified interval. In other words, processor 102 has maximum and minimum power constraints. The minimum energy for a specified interval represents the energy that processor 102 consumes during the interval when it is in its least active state (i.e., operating a minimum power). Processor 102, for example, in conjunction with operating system 209, may execute an "idle" loop when no other threads or tasks require servicing. The idle loop is likely supplied as part of the operating system. The idle loop may be invoked by an application so that, for example, it may be possible to force processor 102 into an idle loop for purposes of determining a minimum power value for the processor. From the minimum power value, a minimum energy value for a specific interval is the product of the minimum power and the length (in terms of time) of the interval.

This minimum power value may be determined in a lab prior to shipping the processor and specified as a data sheet parameter or included within vital product data (VPD) of the system. VPD is product specific information that is stored in a nonvolatile storage element and is accessible to software applications for purposes of determining characteristics of the system. While a VPD-specified minimum power value is easy to retrieve, it may not reflect product specific variations in the parameter or temperature dependent variations in the parameter. Thus, other implementations of the invention may determine the minimum power parameter when the system is booted and, perhaps, periodically thereafter to reflect changes in the parameter with system temperature, etc.

Analogously, the maximum power dissipated by the processor is a valuable piece of information to have. The operating system and/or processor vendor may even provide a specialized piece of code, referred to as a "hot loop," that is intended to exercise the processor at or close to a theoretical maximum power consumption level. The hot loop may be executed by the manufacturer prior to shipping the processor and the resulting maximum power value indicated as a data sheet or VPD parameter. Alternatively, as with the minimum power value, the maximum power value may be determined in the field by invoking the hot loop and taking actual values produced by energy monitor 220. This procedure may be repeated as needed to reflect changes in the parameter.

Determining the maximum and minimum power values experimentally is generally preferably to determining these values from VPD. Experimentally derived values take into account manufacturing variation in the processor (leakage power) that can cause it to use more or less power. Experimentally derived values also take into account environmental factors (hot processors use more power due to leakage power being dependent on temperature).

Regardless of the specific implementation, the energy attribution techniques of the present invention preferably include a step in which a maximum energy value and a minimum energy value are determined. The maximum energy value represents the maximum energy that processor 102 could consume during a (monitor) measurement interval. Conversely, the minimum energy value represents the minimum energy that processor 102 could consume during a measurement interval. These parameters are referred to herein as EMIN and EMAX.

From the EMIN and EMAX values, the energy attribution technique graphically illustrated in FIG. 6 and FIG. 7 derive a first set of boundaries on the energy attributable to a given thread during the measurement interval (thread A in the example). The first set of constraints is identified in FIG. 6 and FIG. 7 as EAMIN1, EAMAX1, EBMIN1, and EBMAX1, where the second character identifies a thread so that, for example, EAMIN1 is the first minimum constraint on the energy attributable to thread A, EBMAX1 is the first maximum constraint on the energy attributable to thread B, and so forth.

This first set of constraints is determined by the EMIN and EMAX values and the percentages produced by (or derived from information produced by) operating system scheduler 210. As described earlier, method 401 and 501 of FIG. 4 and FIG. 5 use input from the operating system scheduler to determine the portion of a measurement interval during which a given thread is active. EAMIN1, for example, is the product of EMIN and the percentage of the corresponding measurement interval during which thread A was active (TA).

In FIG. 6, a graph 600 includes an x-axis corresponding to the energy attributable to thread A and a y-axis corresponding to the energy attributable to thread B. In this graph, the first set of constraints are represented by the lines indicated with reference numerals 610, 620, 630, and 640. EAMIN1 610, for example, is vertical line intersecting the A thread axis (the x-axis) at the value corresponding to the minimum energy attributable to thread A. The first set of constraints outline a rectangle 609 (which is shaded in FIG. 6) defined by the corners 601 through 604. Rectangle 609 represents the area of graph 600 in which the attributed energy values must fall since the rectangle includes every possible value of energy attributable to both threads.

In addition to the first set of constraint lines 610, 620, 630, and 640, an additional constraint line, referred to herein as total energy line 605, is illustrated. As its label implies, total energy line 605 represents the equation ET=EA+EB where ET is the total energy consumed by the processor during a measurement interval, EA is the energy attributed to thread A, and EB is the energy attributed to thread B. Because thread A and thread B are the only threads active during the measurement interval, ET must be the sum of the two.

As mentioned previously, however, in cases where three or more threads are active during a measurement interval, the technique graphically illustrated in FIG. 6 and FIG. 7 can be used by lumping all threads other than the thread of interest into one fictional thread. If, for example, threads A, B, and C are active during a measurement interval, the energy attributable to thread A is derived by graphing the energy of thread A vs. the energy of threads B and C together. Thread B is then determined by graphing thread B vs. threads A and C together and so forth. In this manner, the two-dimensional technique conveyed by FIG. 6 and FIG. 7 is sufficient to attribute energy to individual thread regardless of how many threads are involved.

Points 606 and 607 indicate the intersection of total energy line 605 with EBMAX1 line 630 and EBMIN1 line 640 respectively. Points 606 and 607 represent a second pair of constraints on the energy attributable to thread A. Specifically, EAMIN2 line 650, which is the projection of point 606 onto the EA axis represents a second minimum constraint on the energy attributable to thread A. The EAMIN2 value represents the amount of energy attributable to thread A under the assumption that thread B consumes maximum energy. This second constraint recognizes that thread A must consume an amount of energy equal to the difference between the total energy consumed and the maximum possible energy attributable to thread B. The controlling or operative minimum constraint is the maximum of these two minimum constraints. If EAMIN1 is less than EAMIN2 (as is the case in FIG. 6), then EAMIN2 is the operative minimum constraint on the energy attributable to thread A.

Analogously, for the maximum constraint on EA, point 607 lies on a line EAMAX2 line 660 that represents a second maximum constraint on the energy attributable to thread A. The EAMAX2 value represents the amount of energy attributable to thread A assuming that thread B consumes minimum energy. This second constraints recognizes that thread A cannot consume an amount of energy that exceeds the difference between the total energy consumed and the minimum possible energy attributable to thread B. The operative maximum constraint is the minimum of the first maximum constraint EAMAX1 and the second maximum constraint EAMAX2. In FIG. 6, where EAMAX2 is greater than EAMAX1, EAMAX1 is the operative maximum constraint.

After accounting for the second set of maximum and minimum constraints, a range 615 of possible values attributable to thread A is defined. Specifically range 615 is defined by the intersection of total energy line 605 with the operative minimum constraint on thread A energy and the intersection of total energy line 605 with the operative maximum constraint on thread A energy. In FIG. 6, the operative thread A minimum is represented by EAMIN2 line 650 and the intersection with line 650 with total energy line 605 is represented by point 606. Similarly, the operative thread A maximum is represented by EAMAX1 line 620 and the intersection of line 620 with total energy line 605 is represented by point 611.

Having defined the range of values 615 for the possible values of energy attributable to thread A, the implementation of FIG. 6 selects the midpoint of range 615 as the energy attributable to thread A. This midpoint is shown graphically as point 608 and the projection of point 608 onto the EA axis is the estimate 612 of energy attributable to thread A. The accuracy of the estimate 612 of energy attributable to thread A can be evaluated in terms of its error. The estimate 612 has a maximum error equal to half of the range 615 defined by the operative maximum and minimum constraints on thread A energy. This maximum error constraint may, however, be enlarged, if the error associated with energy monitor 220 exceeds a certain value. The ability of energy monitor 220 to measure energy is imperfect and the potential error of any measurement reported by energy monitor 220 (the measurement error) may be specified (e.g., as part of the VPD). If the product of the measurement error and the estimate 612 of the energy attributable to thread A is greater than ½ of the range 615, the error derived from the measurement error is the operative measure.

Referring now to FIG. 7, a second graph 700 is shown to emphasize the improved accuracy of the method 501 illustrated in FIG. 5 for attributing energy to individual threads. Recalling that method 501 improves the accuracy of attributing energy consumption to a particular thread by attempting to match the energy monitor measurement interval with a period during which the thread of interest is active. An important effect of this technique is to limit significantly the values EBMIN1 and EBMAX1. The maximum and minimum values for thread B are narrowed considerably by using a measurement interval in which the percentage of time corresponding to an active thread B approaches zero. If the percentage of a measurement interval during which thread B is active (TB) is close to zero, the maximum and minimum values of energy attributable to thread B are relatively close together resulting in less error associated with the estimate for thread A.

As shown in FIG. 7, the difference between the EBMAX1 line 730 and the EBMIN1 line 740 is significantly smaller than the corresponding difference in FIG. 6 because the percentage of the measurement interval during which thread B was active in FIG. 6 is greater than the corresponding percentage in FIG. 7. Accordingly, the are of rectangle 709 defined by points 701 through 704 of FIG. 7 is less than the area of rectangle 609 of FIG. 6 and the resulting range 715 of permissible values for EA is narrower than the analogous range 615 in FIG. 6. (Points 706, 707, 708, and 711 are analogous to the points 606, 607, 608, and 611 in FIG. 6). The smaller range 715 of FIG. 7 results in a smaller maximum error for the energy estimate 712 (unless the maximum error is governed by the measurement error of energy monitor unit 220).

As indicated previously, portions of the present invention may be implemented as computer code stored on a computer readable medium. In such embodiments, the computer code when executed by the microprocessor invokes a method of attributing energy to individual threads executing on a processor. One embodiment of such a method 800 is depicted in the flow diagram of FIG. 8.

Figure 8:
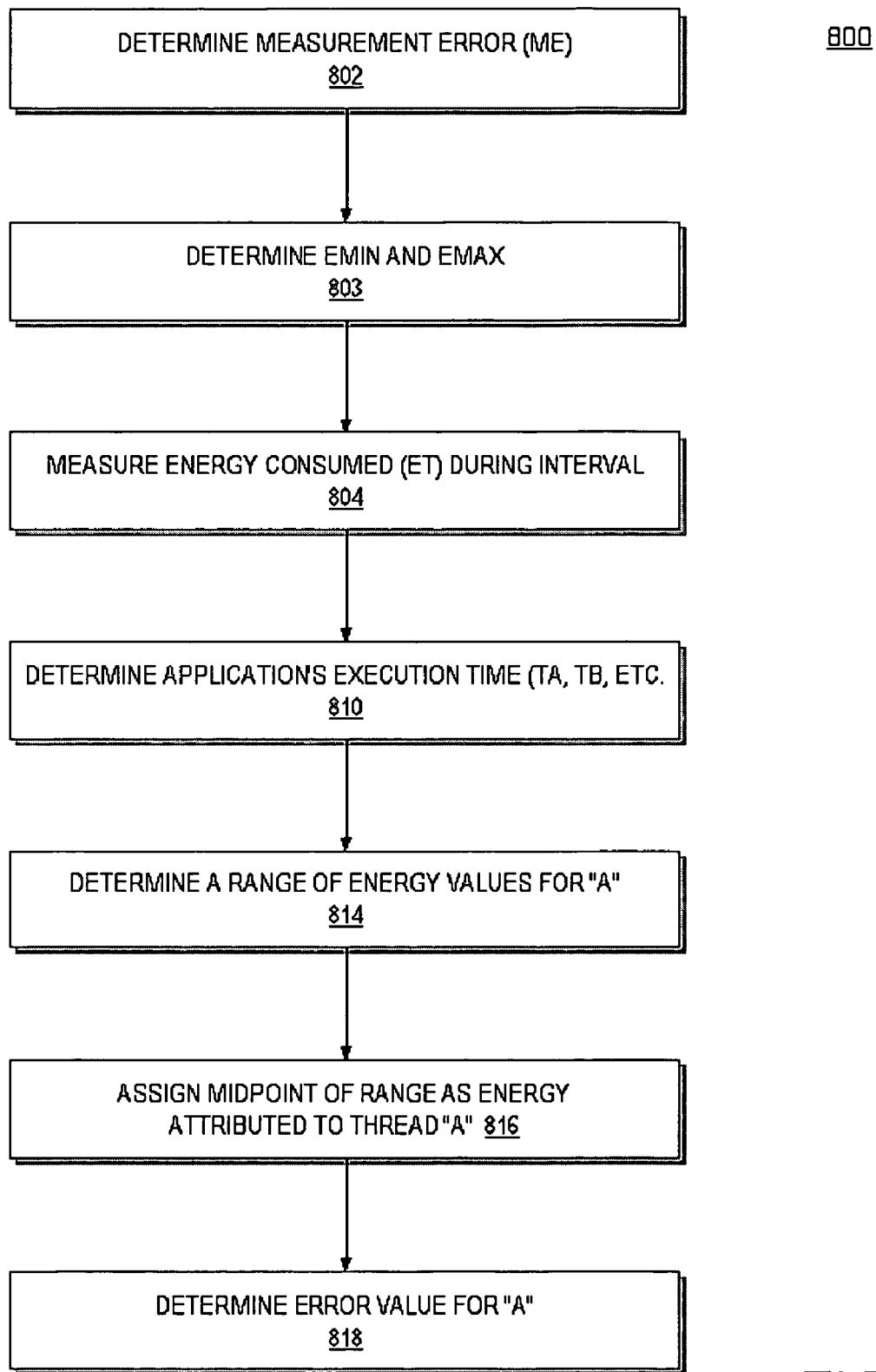
FIG. 8 is a flow diagram of a method of allocating energy consumption to individual threads according to one embodiment of the present invention.

The embodiment of method 800 depicted in FIG. 8 includes determining (block 802) the measurement error (ME) associated with an energy-monitoring unit. The measurement error is preferably determined by retrieving from VPD a value of measurement error determined by a manufacturer of the energy monitor. In addition, method 800 includes determining (block 803) maximum (EMAX) and minimum (EMIN) energy values for the processor wherein EMIN and EMAX represent limits on the total energy that the processor can consume during the measurement interval. EMIN and EMAX may be from VPD or data sheet values. Alternatively, EMIN and EMAX may be determined by running idle loops and hot loops to generate empirical EMIN and EMAX values.

Method 800 includes measuring (block 804) the total energy (ET) consumed during a measurement interval. As described in the preceding text, the measurement of consumed energy is achieved with a hardware/firmware implemented energy monitor unit. The measurement interval may be a fixed duration interval or a variable duration interval determined by the occurrence of thread context switches.

Following the measurement of an energy value, method 800 then attributes the measured value of energy to each of the threads that executed during the measurement interval. This process includes determining (block 810), for each thread that executed during the interval, the time or duration associated with each thread. These time values represent the percentage of the measurement interval during which the corresponding thread was active.

Using the time values determined in block 810 and the EMIN, EMAX values determined in block 803, method 800 includes determining (block 814) a range of permissible values for the energy attributable to the thread of interest (thread A in FIG. 8).

Figure 9:
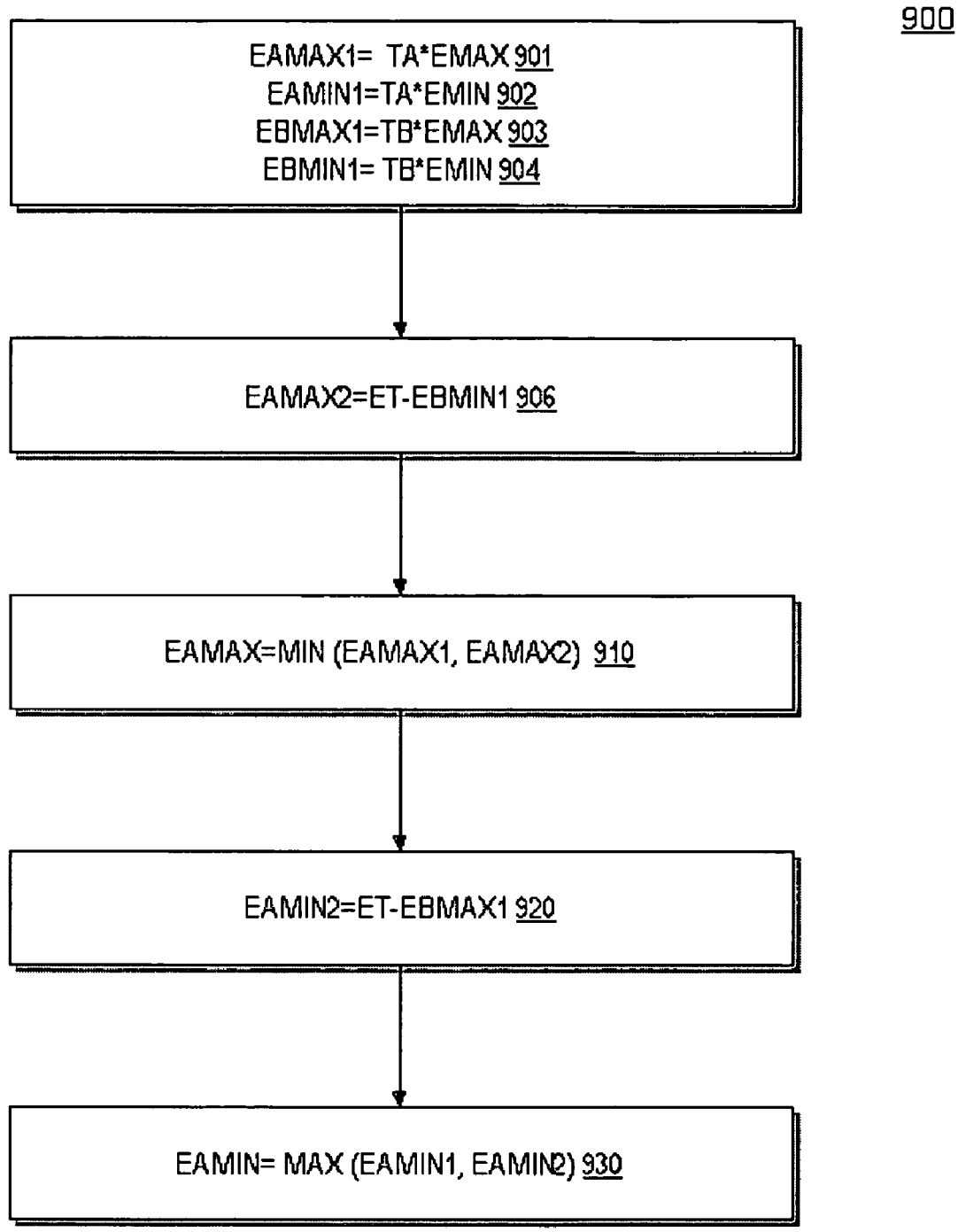
FIG. 9 is a flow diagram illustrating additional details of the method of FIG. 8.

Referring to FIG. 9, details of block 814 of FIG. 8 according to one embodiment of the invention are shown. As depicted in FIG. 9, the determination of a range of energy values for thread A includes determining (blocks 901-904) a first set of minimum and maximum energy constraints for each thread (FIG. 9 assumes two threads, thread A and thread B). The maximum energy values for each thread are equal to the product of EMAX and the time associated with the thread so that, for example, the first maximum constraint on the energy attributable to thread A (EAMAX1) equals EMAX*TA (where TA is the time associated with thread A). Similarly for the minimum constraint on thread A and maximum and minimum constraints on thread B.

Having determined the first set of minimum and maximum constraints, a second of constraints for the energy attributable to thread A is derived. In the depicted embodiment, the second set of maximum and minimum constraints for thread A is determined from the total energy measurement and the maximum and minimum constraints on thread B. Specifically, as shown in block 906, a second maximum constraint on the thread A (EAMAX2) is equal to the difference between the total energy measured (ET) and EBMIN1 (the minimum energy for thread B). This second constraint recognizes that, for a given value of total energy consumed by threads A and B, the thread A maximum is constrained by the thread B minimum. A larger thread B minimum decreases the maximum energy attributable to thread A and, conversely, a smaller thread B minimum increase the thread A maximum.

Having determined two maximum constraints on thread A, one of the two constraints is selected as the controlling maximum constraint. The controlling maximum constraint for the energy attributable to thread A is the minimum (block 910) of the first maximum energy constraint EAMAX1 on thread A and the second maximum energy constraint (EAMAX2).

Similarly, for the operative minimum constraint on the energy attributable to thread A, a second minimum constraint for thread A is determined (block 920) as the difference between the total energy and the maximum constraint on thread B. The operative minimum constraint on thread A is then determined (block 930) to be the maximum of the two constraints. At the conclusion of the process depicted in FIG. 9 the operative minimum and maximum constraints on thread A define the range of energy values attributable to thread A.

Returning now to FIG. 8, following the determination on a range for energy values attributable to thread A, a value from within the range is assigned (block 816) as the value of energy attributed to thread A. According to the method 800 depicted in FIG. 8, the midpoint of the identified range is selected as the energy attributable to thread A.

An error value is then determined (block 818) for thread A. In one embodiment, the error is the greater of two independent error measures. The first error measure is the product of the inherent measurement error associated with energy monitor 220 (which may be supplied as part of VPD) and the estimate of energy attributed to thread A. The second error measure is equal to half of the range determined in block 814. The larger of these two error measures is used as the error measure associated with the estimate of energy attributed to thread A.

Figure 11:
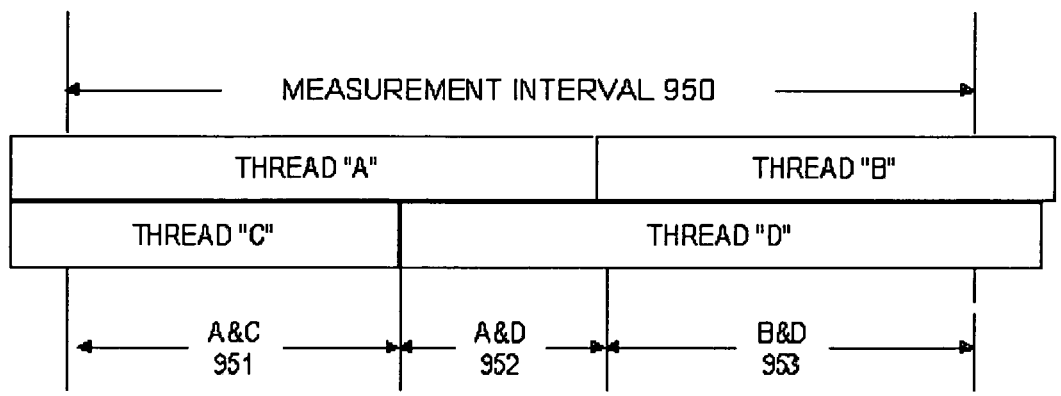
FIG. 11 is a conceptual representation of the present invention applied to the simultaneous multithreaded (SMT) embodiment of the microprocessor.

In the foregoing text, processor 102 is assumed to execute a single thread at any instance in time (although two or more threads are being handled concurrently). The energy attribution techniques described herein may be modified to apply to an SMT processor. Referring to FIG. 11, a conceptual representation of an SMT processor is depicted. In the depicted representation, the processor is capable of executing two threads simultaneously. Thus, FIG. 11 shows a first "side" of the processor executing thread A and thread B while simultaneously executing threads C and D on a second side of the processor. In this case, the energy monitor 220 is only capable of measuring and reporting the energy consumed by the processor as a whole and is not capable of reporting energy measured for each side of the processor. Under this constraint, the energy monitor 220 may be used to allocate energy to distinct "couplets" of threads. Energy allocation to individual threads may then be extrapolated using energy consumption proxies.

As shown in FIG. 11, measurement interval 950 is divide into three distinct couplets 951, 952, and 953. Threads A and C are active during couplet 951, threads A and D are active during couplet 952, and threads B and D are active during couplet 953. The techniques described above for attributing energy to threads may be invoked to attribute energy to couplets in FIG. 11. Thus, energy consumption may be allocated to couplets 951 through 953. Extrapolating couplet-based energy consumption data may then be achieved using an energy consumption proxy. Many processors 102, for example, include performance monitor registers that record details of the performance of processor 102. An example of a typical performance monitor is a monitor that records the number of instructions fetched for each thread. Other monitors may include the number of instructions retired and so forth. Any of these performance monitors may be used to allocate energy attributed to a particular couplet between the component threads of the couplet. If, for example, a performance monitor indicates that thread A has fetched instructions at a rate of 3:2 with respect to thread C, energy attributed to couplet 951 could then be allocated to thread A and thread C in a ratio of 3:2. In this manner, the energy attribution techniques used in conjunction with energy monitor 220 may be extended to an SMT processor.

Figure 12:
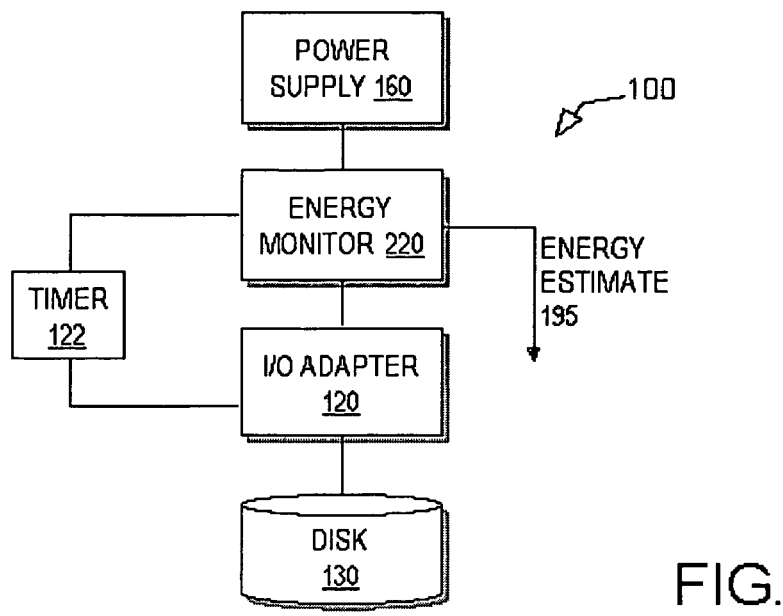
FIG. 12 is a block diagram of an embodiment emphasizing the ability to determine energy attributable to a peripheral device such as a disk controller.
Figure 13:
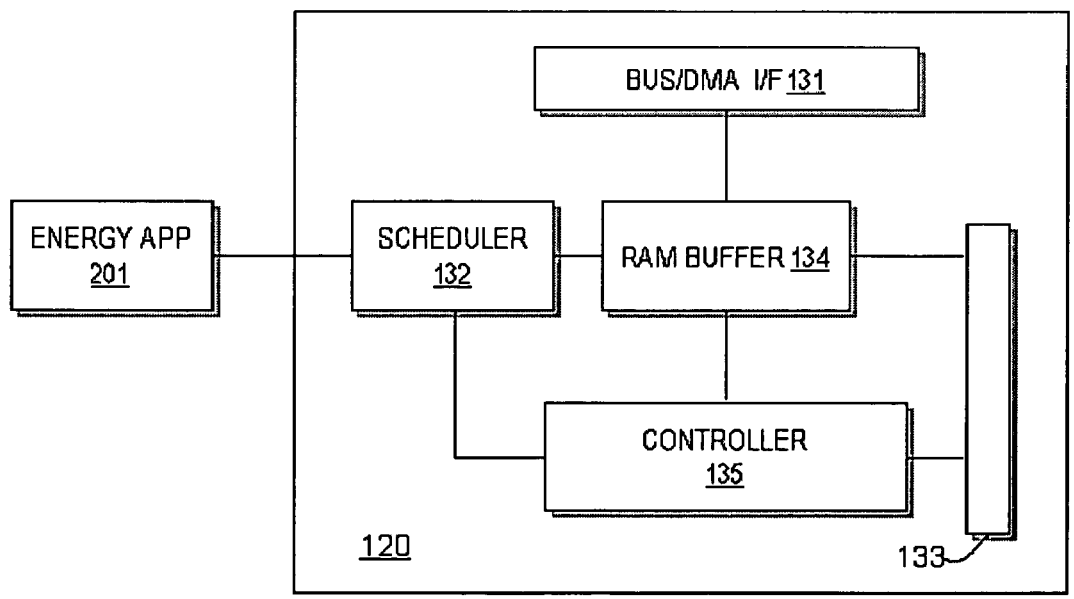
FIG. 13 is a block diagram of selected elements of a disk controller of FIG. 12.

Referring now to FIG. 12 and FIG. 13, one embodiment of the invention extends the energy monitoring functionality beyond microprocessor energy consumption to encompass energy consumption by a peripheral device such as a disk controller. In FIG. 12, the I/O adapter 120 of FIG. 1 is connected to energy monitor 220 so that energy monitor 220 can measure the energy consumed by I/O adapter 120 during a measured interval. In the depicted embodiment, I/O adapter 120 is a disk controller that is connected to one or more magnetic disks represented by reference numeral 130. A timer 122 is shown as connected to both the energy monitor 220 and I/O adapter 120. In this implementation, timer 122 provides a common timing base for monitor 220 and adapter 120.

FIG. 13 illustrates additional detail of a disk controller adapter 120 suitable for use with the energy monitoring hardware. As depicted in FIG. 13, disk controller adapter 120 includes a bus/DMA interface 131 that enables adapter 120 to communicate with the main processors 102 (see FIG. 1) and to access system memory 110. A RAM buffer 134 provides buffer space for command vectors as well as data. A controller 135 is coupled to RAM buffer 134 and a disk interface 133. A scheduler 132 controls execution of command vectors (not shown) in RAM buffer 134. Scheduler 132 of adapter 120 is analogous in function to the operating system scheduler 210 (see FIG. 2). Scheduler 132 is responsible for determining the order in which buffered command vectors are executed by controller chip 135.

In the preferred embodiment, scheduler 132 is interfaced to the energy application 201. Scheduler 132 is able to communicate information regarding the time during which any particular buffered command vector is executed. In addition, because energy monitor 220 is also connected to I/O adapter 120, the embodiment of data processing system 100 illustrated in FIG. 12 and FIG. 13 is able to attribute energy consumption to specific command vectors executing on a peripheral device such as a disk controller. Moreover, because there is an inherent association between peripheral device command vectors and threads executing on main processor 102, the depicted embodiment of system 100 is able to attribute peripheral device energy consumption to individual threads. Given the ability to measure energy consumed by a peripheral unit-during a specified interval and the ability to determine which threads were active during portions of the interval, the method of attributing energy consumed by a peripheral device is functionally analogous to method 800 described above with respect to FIG. 8.

Generalizing on the specific embodiments of described above with respect to FIG. 1 through 13, the preferred embodiment encompasses attributing energy consumed by a functional unit to the various objects for which the functional unit is performing tasks. As seen in the depicted embodiments, the functional unit could be a main processor or a peripheral device such as a disk controller. The objects might be multiple threads being scheduled by an operating system or multiple operating systems being scheduled by a hypervisor. In either case an energy monitor is configured to measure total energy consumed by the functional unit during a measurement period. A scheduler, whether it is a hypervisor scheduler, an operating system scheduler, or some other form of scheduler, provides timing information indicative of time periods during which the functional unit was performing tasks (executing) for each of the objects. An application on attributes portions of the total energy to each of the objects based, at least in part, on the timing information.

Thus, it will be apparent to those skilled in the art having the benefit of this disclosure that the present invention contemplates a system and method for allocating energy consumption to individual software threads executing on the system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing system, comprising:
   a processor to execute a first thread during a first portion of a measurement interval and a second thread during a second portion of the measurement interval;
   an energy monitor to determine the total energy consumed by the processor during the measurement interval absent separate measurement of energy consumed during the first and the second portions of the measurement interval; and
   energy attribution code, stored in a processor readable storage medium, to estimate a first amount of the total energy attributable to the first thread and a second amount of the total energy attributable to the second thread comprising:
   determining from the execution time of the first thread a maximum and minimum energy constraint for the first thread, wherein the maximum and minimum energy constraint for the first thread represent constraints on the amount of the total energy attributable to the first thread;
   determining from the execution time of the second thread a maximum and minimum energy constraint for the second thread, wherein the maximum and minimum energy constraint for the second thread represent constraints on the amount of the total energy attributable to the second thread;
   using the first and second thread maximum and minimum energy constraints and the total energy to define a range for the amount of the total energy attributable to the first thread; and
   using a point within the defined range as the estimate of the amount of the total energy attributable to the first thread.

2. The data processing system of claim 1, wherein the energy attribution code to use the first thread maximum and minimum energy, the second thread maximum and minimum energy, and the total energy includes code to:
   determine a minimum constraint on the range by determining a second minimum energy constraint for the first thread representing the amount of the total energy attributable to the first thread assuming the processor consumed the maximum amount of energy to execute the second thread; and selecting the greater of the first minimum energy constraint for the first thread and the second minimum energy constraint for the first thread as the operative minimum constraint.

3. The data processing system of claim 2, wherein the energy attribution code to use the first thread maximum and minimum energy, the second thread maximum and minimum energy, and the total energy includes code to:
determine a maximum constraint on the range by determining a second maximum energy constraint for the first thread representing the amount of energy attributable to the first thread assuming the processor consumed the minimum amount of energy to execute the second thread; and
select the lesser of the first maximum energy constraint for the first thread and the second maximum energy constraint for the first thread as the operative maximum constraint.

4. The data processing system of claim 1, further comprising a second processor and a second energy monitor to determine the total energy consumed by the second processor during the measurement interval, wherein the energy attribution code estimates an amount of the total energy consumed by the second processor to execute a third thread and an amount of the total energy consumed by the second processor used to execute a fourth thread.

5. The data processing system of claim 1, wherein the estimates of the amount of the total energy attributable to the first and second threads is based at least in part on respective execution times of the first and second threads.

6. A data processing system, comprising:
a functional unit implemented in hardware to perform tasks for multiple objects including at least one task supporting a first object and a second object;
a hardware energy monitor implemented in hardware to measure total energy consumed by the functional unit during a measurement period absent separate measurement of energy consumed during the first and the second portions of the measurement interval;
a scheduler to provide timing information indicative of time portions of the measurement period during which the functional unit was performing the at least one task for each of first and second objects; and
an application to attribute portions of the total energy to each of the objects based on the timing information and the total energy consumed by the functional unit during the measurement interval, including deriving maximum and minimum energy constraints for each of the objects and determining an energy consumption value between the constraints.

7. The data processing system of claim 6, wherein the functional unit is selected from the group consisting of: a processor, a peripheral device, and a disk controller.

8. The data processing system of claim 6, wherein each of the multiple objects is a thread executing under control of an operating system.

9. The data processing system of claim 6, wherein each of the multiple objects is an operating system executing control of a hypervisor.

10. The data processing system of claim 6, wherein the application attributes portions of the total energy to each of the objects subject to maximum and minimum energy consumption constraints.

11. The data processing system of claim 10, wherein the maximum and minimum constraints are determined from maximum and minimum energy consumption rates associated with the functional unit and the timing information.

12. The data processing system of claim 6, wherein the system determines the measurement period based on the timing information wherein a first object was performing tasks for a substantial majority of the measurement period.

13. A computer program product comprising computer executable instructions, stored on a computer-readable medium, for attributing energy consumption in a data processing system to objects executing in the system, the program product comprising:
computer code to determine a total energy consumed by the data processing system during a measurement period absent separate measurement of energy consumed during the first and the second portions of the measurement interval;
computer code to determine timing information for a plurality of objects within a single task, wherein the timing information is indicative of which objects were executing during the measurement period;
computer code to use the timing information and the total energy to attribute the energy to each of the objects, including deriving maximum and minimum energy consumption constraints for each of the objects; and
computer code to determine an energy consumption value for each object between the maximum and minimum energy consumption constraints associated with that object.

14. The computer program product of claim 13, wherein the computer code to determine timing information comprises a scheduler to schedule execution of threads on a processor of the data processing system.

15. The computer program product of claim 13, wherein the computer code to determine timing information comprises a hypervisor scheduler providing context switch information to schedule execution of a one or more operating system objects.

16. The computer program product of claim 13, wherein the computer code to determine timing information comprises disk controller scheduler to schedule tasks for execution on a disk controller.

* * * * *